(12) United States Patent
Kraus et al.

(10) Patent No.: US 7,980,027 B2
(45) Date of Patent: Jul. 19, 2011

(54) GUIDE ASSEMBLY FOR A VEHICLE WINDOW

(75) Inventors: Juergen Kraus, Balve (DE); Holger Rau, Reichshof Sinspert (DE); Ralf Gerndorf, Finnentrop (DE)

(73) Assignee: Dura Automotive Plettenberg Entwicklungs-und Vertriebs GmbH, Plettenberg (DE)

( * ) Notice: Subject to any disclaimer, the term of this patent is extended or adjusted under 35 U.S.C. 154(b) by 610 days.

(21) Appl. No.: 10/945,458

(22) Filed: Sep. 20, 2004

(65) Prior Publication Data

US 2005/0210751 A1     Sep. 29, 2005

(30) Foreign Application Priority Data

Sep. 18, 2003  (DE) .................. 103 43 216

(51) Int. Cl.
*E05D 15/10*     (2006.01)
(52) U.S. Cl. ................. 49/209; 49/213; 49/413; 49/380
(58) Field of Classification Search .............. 49/209, 49/213, 214, 413, 380, 375, 504, 411, 410; 296/146.16, 146.15, 201; 16/96 R, 96 L, 16/94 R
See application file for complete search history.

(56) References Cited

U.S. PATENT DOCUMENTS

| | | | | |
|---|---|---|---|---|
| 1,637,367 A | * | 8/1927 | Zimmers et al. | 49/440 |
| 3,564,204 A | * | 2/1971 | Mense | 219/497 |
| 4,208,755 A | * | 6/1980 | Shepherd | 15/160 |
| 4,222,427 A | * | 9/1980 | Buchner | 160/19 |
| 4,281,480 A | * | 8/1981 | Wendt | 49/504 |
| 4,311,336 A | | 1/1982 | Jarauch et al. | |
| 4,615,558 A | * | 10/1986 | Nakamura et al. | 296/203.03 |
| 5,442,880 A | * | 8/1995 | Gipson | 49/413 |
| 5,467,557 A | * | 11/1995 | Jones | 49/171 |
| 5,537,782 A | | 7/1996 | Leinder et al. | |
| 5,546,704 A | * | 8/1996 | Maruoka | 49/375 |
| 6,266,924 B1 | * | 7/2001 | Rissone | 49/308 |
| 6,321,495 B1 | * | 11/2001 | Oami | 52/208 |
| 6,925,767 B2 | * | 8/2005 | Krochmal et al. | 52/455 |
| 7,003,916 B2 | * | 2/2006 | Nestell et al. | 49/413 |

FOREIGN PATENT DOCUMENTS

| | | |
|---|---|---|
| DE | 2841 177 | 4/1980 |
| DE | 434 0013 | 6/1995 |
| DE | 199 16 619 | 11/2000 |
| DE | 19916619 | 11/2000 |
| DE | 10036 813 | 9/2001 |
| DE | 10122637 | 10/2002 |
| EP | 0 956 987 | 11/1999 |
| EP | 0968 862 | 1/2000 |
| FR | 2 577 483 | 12/1986 |
| FR | 2 742 099 | 12/1995 |
| FR | 2 833 209 | 6/2003 |
| WO | WO 00/37274 | 6/2000 |

\* cited by examiner

*Primary Examiner* — Gregory J. Strimbu
(74) *Attorney, Agent, or Firm* — Dilworth & Barrese, LLP.

(57) ABSTRACT

An assembled component for a motor vehicle includes a lower flitch (6), an upper flitch (7), and an intercalation (8) disposed between the lower flitch (6) and the upper flitch (7). The lower flitch (6) and the upper flitch (7) are directly connected at joining points (15, 41) wherein the upper flitch defines at least one guide groove configured to support a window for relative movement within the at least one groove.

21 Claims, 6 Drawing Sheets

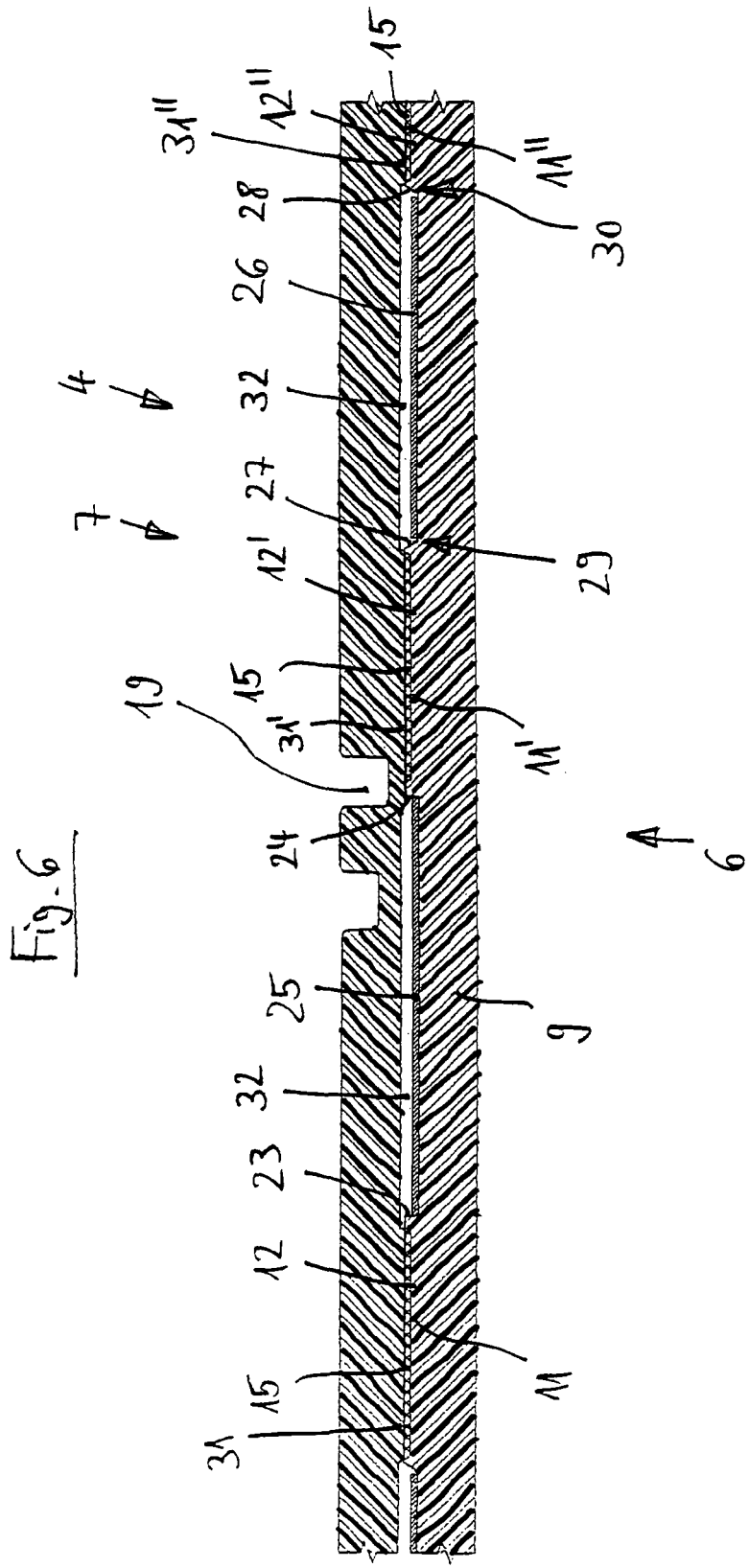

GUIDE ASSEMBLY FOR A VEHICLE WINDOW

BACKGROUND OF THE INVENTION

The invention relates to an assembled component for a motor vehicle, in particular for a fixed or movable window, in particular a sash window of a motor vehicle, with a lower flitch, an upper flitch, and an intercalation between the lower flitch and the upper flitch. The assembled component can also be used for other parts of a motor vehicle, in particular for a fixed or movable plate or another part of the body of a motor vehicle.

German Patent DE 19916619 A1 discloses an assembled component comprised of three individual pieces, namely an upper piece made according to a spray-cast method for plastics, a lower piece made of plastic, and a reinforcement piece designed as a piece of metal sheet positioned between the upper piece and the lower piece. In order to compensate for heat expansion and component tolerances, profile elements made of elastic material are put to work at the connection points between the individual pieces.

SUMMARY OF THE INVENTION

The task of the invention is to propose an improved assembled component of the type indicated at the start.

This task is solved according to the invention by having the lower flitch and the upper flitch be connected to one another at joining points.

Advantageous further developments are described herein.

The lower flitch and the upper flitch may be adhered and/or bonded together. This achieves increased stability of the assembled component. The arrangement is preferably done in such a way that the intercalation is held fixed by non-positive and/or positive locking, which can further increase the stability of the assembled component. It is advantageous when the upper flitch and the lower flitch are connected to one another by vibration welding and/or friction welding.

The lower flitch and/or the upper flitch may be ribbed. The ribs can be lengthwise and/or diagonal or slanted and/or crosswise ribs.

It is advantageous when the joining points are located on the peripheral edges of the lower flitch and upper flitch and/or on the ribs. The joining points can be located near the middle of the ribs and/or at the ends of the ribs. In particular, the ribs can have rises, with the joining points being provided at their tips.

Another advantageous further development is characterized in that the intercalation has perforations. The perforations are preferably designed as slits. It is advantageous when the perforations or slits run lengthwise along the assembled component. This can help to reduce internal stresses that may arise due to temperature fluctuations. In temperature fluctuations, the changes in the length of the upper flitch and lower flitch are greatest in the lengthwise direction. Due to the lengthwise perforations or slits, the lengthwise expansions of the upper flitch and lower flitch are decoupled from the adhesion of the intercalation to the window. The upper flitch and lower flitch can extend lengthwise without exerting any stresses thereby on the adhesion of the intercalation to the window.

Another advantageous further development is characterized in that the perforations or slits are penetrated by joining points, or rises at which joining points are located. In particular, the rises can be rises of the ribs, or rises that are provided on ribs.

Another advantageous further development is characterized in that locating faces are provided at one or more perforations or slits and/or at one or more joining points or rises. This can provide for a definite positioning between the individual pieces of the assembled component, especially between the intercalation and the lower flitch and/or the upper flitch.

According to another advantageous further development, expansion gaps are provided at one or more perforations or slits and/or at one or more joining points or rises. In particular, this makes it possible to compensate for differences in length due to differing heat expansions of the individual pieces of the assembled component. It is especially advantageous when two locating faces are provided between two adjacent perforations or slits and at the corresponding joining points or rises and when expansion gaps are provided at the other perforations or slits and joining points or rises. In this way, a definite positioning of the parts of the assembled component is attained, preferably near the middle of the assembled component. The changes in length produced by the differing heat expansions are able to be compensated for at the expansion gaps that are also present.

It is advantageous when the intercalation has a bend. If the intercalation is designed as a piece of metal sheet, the bend can be produced as a fold. The bend serves preferably as a joint, in particular as an adhesion point, for a window or sash window of a motor vehicle or for a catch that is connected or connectable to the window or sash window of the motor vehicle.

It is advantageous when one or more catches are provided that are connectable or connected to the assembled component. Preferably the catch(es) can be connected to the component in detachable fashion. Preferably the catch(es) can be inserted or snapped into the assembled component. The catch is preferably connectable or connected, especially adherable or adhering, to the body of a motor vehicle. It can form a joining point with the window or sash window.

The upper flitch and/or the lower flitch may have one or more guide tracks, especially guide grooves, for a sash window of a motor vehicle.

It is advantageous when one or more cleaning holes are provided in the guide tracks or guide grooves. In this way, the guide tracks or guide grooves can be self-cleaning.

BRIEF DESCRIPTION OF THE DRAWINGS

An embodiment of the invention is explained in detail below using the attached drawings.

FIG. 6 shows a cross-section along line 6-6 of FIG. 3.

DESCRIPTION OF THE PREFERRED EMBODIMENTS

Figure 1:
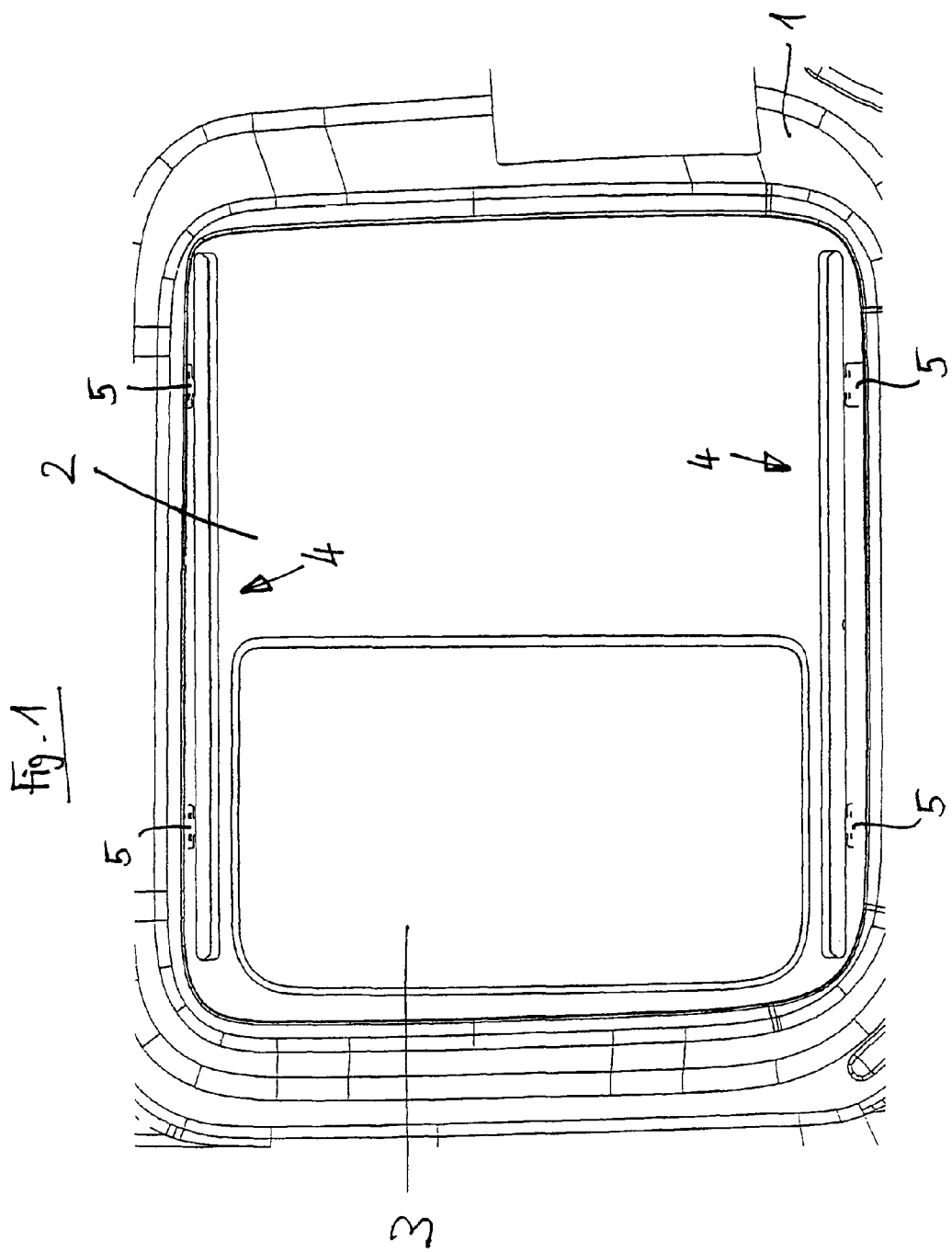
FIG. 1 shows a side window of a motor vehicle in an installed side view.

FIG. 1 shows a part of a body 1 of a motor vehicle, into which a window 2 is inserted, in which a movable window 3 is located. Fixed window 2 has a guide track 4 at its upper area and at its lower area, and catchers 5 of these guide tracks are firmly adhered to fixed window 2. Guide track 4 shown in FIG. 1 runs horizontally. In other applications, guide track 4 may run diagonally.

Figure 2:
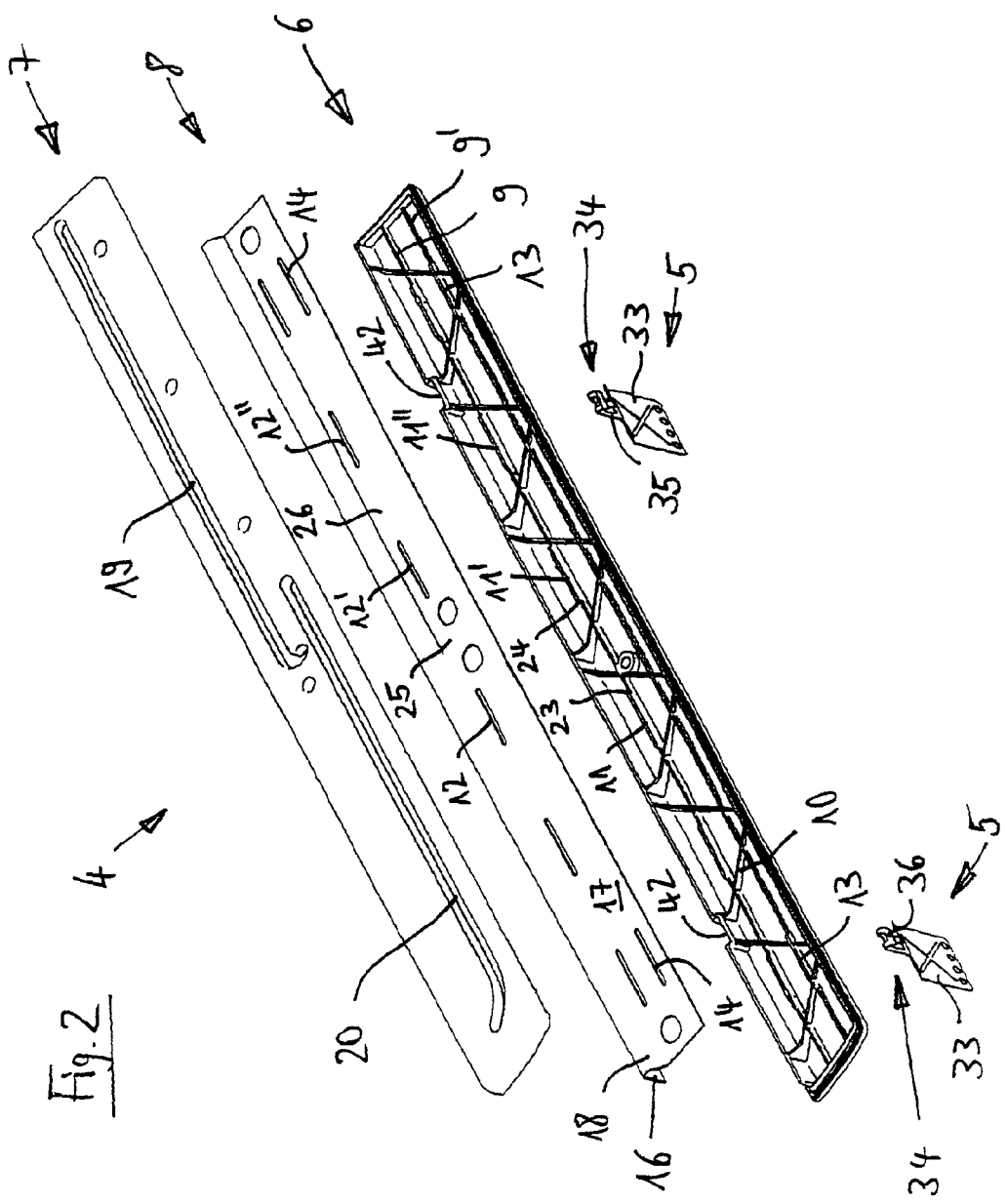
FIG. 2 shows the individual pieces of the assembled component in a perspectival exploded view.
Figure 3:
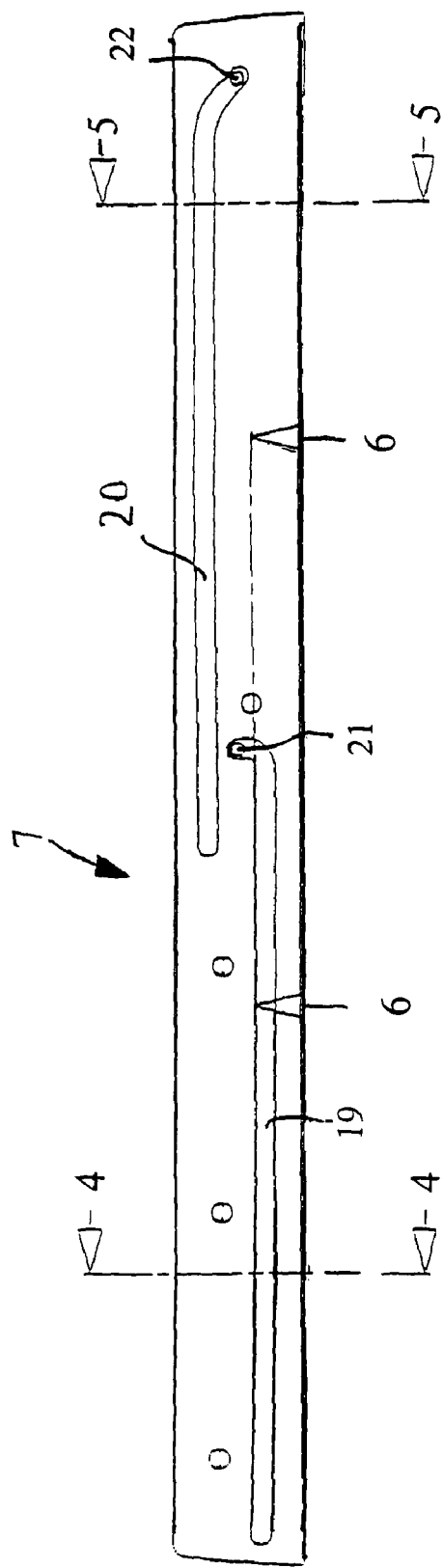
FIG. 3 shows the assembled component of FIG. 2 in a top view.

As shown in FIG. 2, the assembled component, namely guide track 4, is comprised of a lower flitch 6 made of plastic, an upper flitch 7 made of plastic, and an intercalation 8 made of steel or steel sheet that is situated between lower flitch 6 and upper flitch 7 in the assembled state. As can be seen in FIG. 2, lower flitch 6 has ribs on its side that faces upper flitch 7, namely lengthwise ribs 9, 9' and diagonal ribs 10 that run in a zig-zag pattern.

Lengthwise rib 9 has six rises 11, each of which penetrates a corresponding lengthwise slit 12 of intercalation 8. Near the ends of lengthwise rib 9', which runs parallel to and is spaced at an interval from lengthwise rib 9, two additional rises 13 are provided that penetrate corresponding additional lengthwise slits 14 in intercalation 8. The upper tips or tip areas of rises 11 and additional rises 13 form joining points 15 at which lower flitch 6 and upper flitch 7 are connected to one another, namely by vibration welding. Additional joining points 15' are formed by the peripheral edges of lower flitch 6 and upper flitch 7. Lower flitch 6 and upper flitch 7 are also connected to one another, namely vibration welded, at these joining points 15'.

Intercalation 8 has a bend 16, that is connected to the flat main surface 17 of intercalation 8 via a crimp 18. Main surface 17, crimp 18 and bend 16 are produced by bending a steel sheet. Flat main surface 17 runs down the middle between lower flitch 6 and upper flitch 7. Crimp 18 is provided on the side of guide track 4 that is turned toward fixed window 2. It runs facing upper flitch 7. Bend 16 runs from there toward lower flitch 6. It is adhered to fixed window 2.

Two guide grooves 19, 20 are provided in upper flitch 7, in which the corresponding guide pegs (not shown in the drawing) of movable window 3 engage, and are guided thereby in a sliding manner. At one end of each guide groove 19, 20 there is a cleaning hole 21, 22, so that guide grooves 19, 20 are self-cleaning and long-lasting function is guaranteed.

As shown in FIG. 6, two locating faces 23, 24 are provided on rib 9. Locating face 23 is formed by the right end face of rise 11. Locating face 24 is formed by the left end face of rise 11', which is adjacent to rise 11 to its right. The corresponding locating faces of intercalation 8 are the right end face of lengthwise slit 12 and the left end face of lengthwise slit 12', which is adjacent to lengthwise slit 12 to its right. As shown in FIG. 6, area 25 of intercalation 8 between lengthwise slits 12 and 12' lies between locating faces 23 and 24 of lower flitch 6. The space between locating faces 23 and 24 is exactly as long as the length of area 25, so that area 25 lies snugly between locating faces 23 and 24 without any play.

The adjacent area 26 on the right side of intercalation 8, between lengthwise slits 12' and 12", is somewhat shorter than the distance between right end face 27 of rise 11' and left end face 28 of rise 11". In this way, expansion gaps 29 and 30 are formed between the ends of area 26 and adjacent end faces 27 and 28, by means of which the different heat expansions of the individual pieces, that is, lower flitch 6, upper flitch 7, and intercalation 8, can be compensated for.

Rises 11, 11', 11" are situated opposite corresponding rises 31, 31', 31" of upper flitch 7, which can be formed on ribs of upper flitch 7. Joining points 15 are located in the areas where rises 11, 11', 11" and 31, 31', 31" overlap. Depressions 32 are provided between rises 31, 31', and 31" of upper flitch 7.

Guide track 4 is connected to fixed window 2, namely by adhesion. A safeguard is created by two catches 5 that are connected to body 1 by an adhesion 40 and that have an attachment surface 33 and a clip 34. Clip 34 is comprised of a upward-pointing tongue 35, from which a hook 36 is extended by bending, and a clamping piece 37 that points in the same direction as hook 36 and that is bent out of the middle portion of tongue 35.

Figure 4:
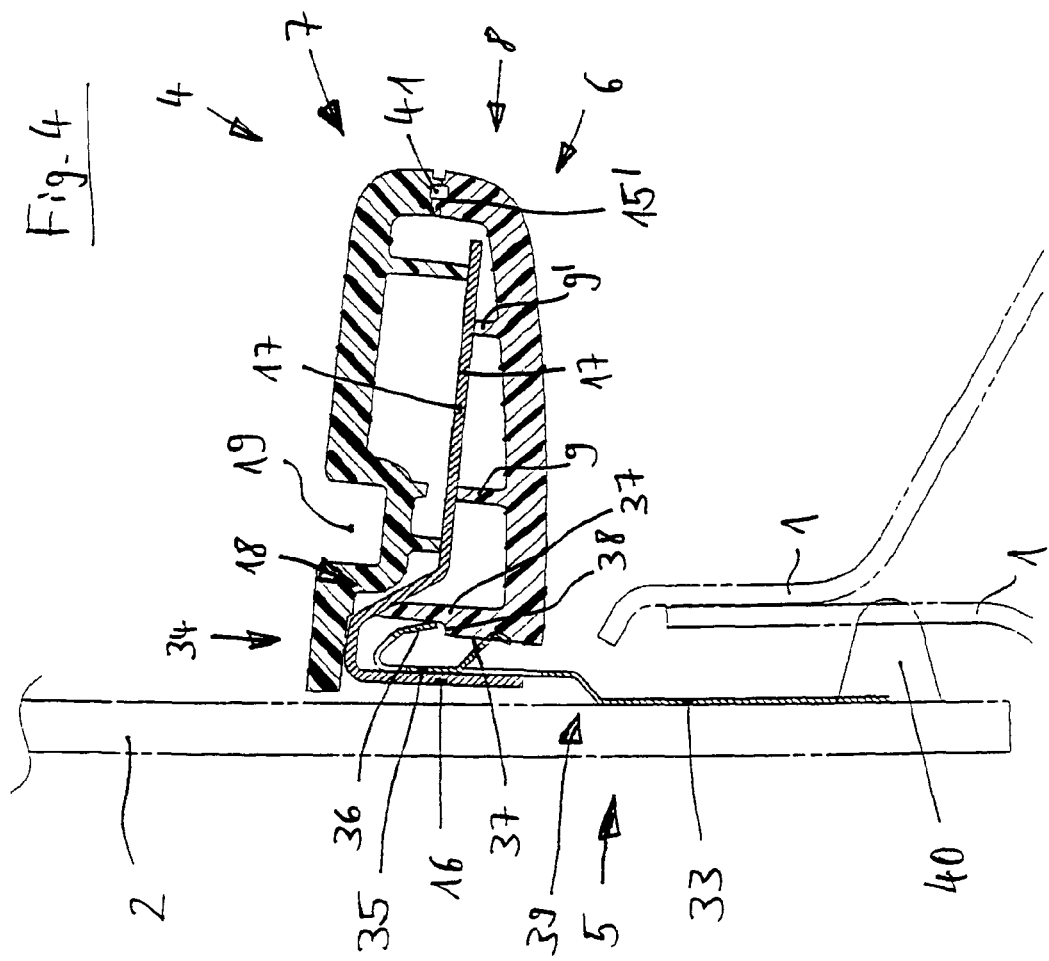
FIG. 4 shows a cross-section along line 4-4 of FIG. 3.
Figure 5:
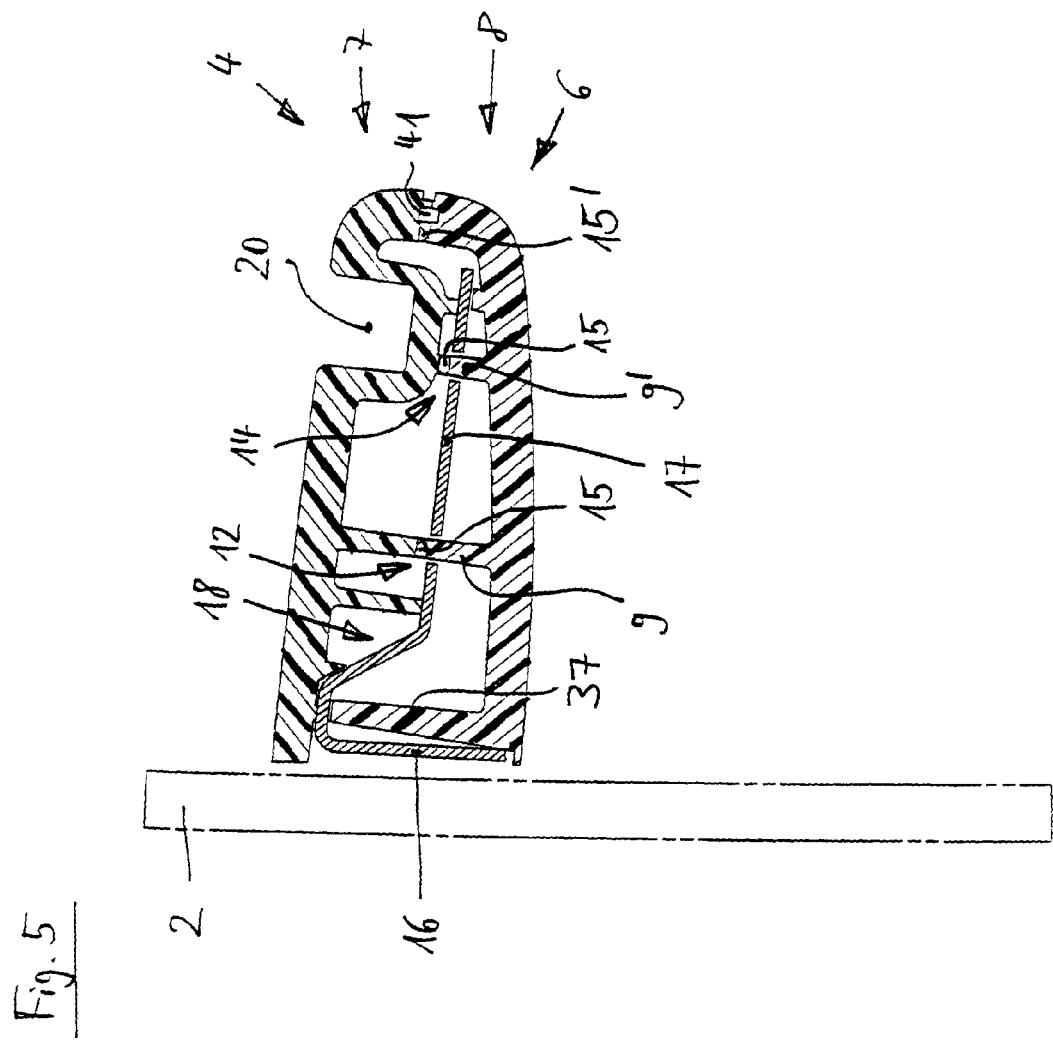
FIG. 5 shows a cross-section along line 5-5 of FIG. 3.

Clip 34 is clamped in between bend 16 of intercalation 8 and the rear end wall 37 of lower flitch 6, as shown in FIG. 4. For this purpose, rear end wall 37 has an indentation 38 that is engaged by the tip of hook 36.

Clip 34 is connected to attachment surface 33 of catch 5 via a crimp 39. Attachment surface 33 lies flat against fixed window 2. At its lower end it is adhered to fixed window 2, namely by the same adhesion 40 by means of which fixed window 2 is adhered to body 1. In addition, attachment surface 33 of clip 34 of catch 5 is also adhered to body 1 by means of adhesion 40.

Lower flitch 6 and upper flitch 7 are connected, namely bonded, at their outer edges by another joining point 41. Rear end wall 37 of lower flitch 6 has a groove 42 for each catch 5, and the depth of the groove essentially matches the thickness and corresponding strength of tongue 35.

In the described embodiment, internal stresses can arise due to temperature fluctuations. For this purpose, lengthwise slits 12, 14 of intercalation 8, running lengthwise along guide track 4, and corresponding rises 11, 13 of lower flitch 6 are useful. In the event that fixed window 2 breaks, catches 5 prevent pieces of side window 2 and movable window 3 from entering the interior of the vehicle.

The described embodiment allows for inexpensive manufacture using simple tools. The adhesive connections enable low-stress fastening. In this way, a high level of stability can be achieved. In addition, a great unity of design is made possible, since additional masking is unnecessary, so that a large design surface is available.

The invention claimed is:

1. An assembled guide rail component for a substantially vertically oriented sliding window of a motor vehicle, the component comprising an elongated longitudinally extending lower flitch (6), an elongated longitudinally extending upper flitch (7), and an elongated longitudinally extending intercalation (8) disposed between the lower flitch (6) and the upper flitch (7), the lower flitch (6) and the upper flitch (7) being fixedly connected to and in contact with each other at joining points (15, 15'), wherein the upper flitch includes an upper substantially horizontal major surface which entirely defines at least one horizontally extending substantially U-shaped guide groove configured to support the vertically oriented window, said window having a bottom portion which is slidably movable within the at least one groove, wherein said lower flitch (6) defines at least one elongated longitudinally extending rib and the intercalation defines at least one elongated longitudinally extending opening, wherein the at least one rib extends through the at least one longitudinally extending opening to engage the upper flitch and form one of the the joining points.

2. The assembled component of claim 1, wherein said lower flitch (6) is welded to said upper flitch (7) at the joining points (15, 15').

3. The assembled component of claim 2, wherein the joining points (15, 15') are disposed at respective opposing portions of said lower flitch (6) and said upper flitch (7).

4. The assembled component of claim 2, wherein said lower flitch (6) defines a plurality of elongated longitudinally extending ribs (9, 9', 10).

5. The assembled component of claim 4, wherein each of the plurality of ribs defines a respective one of the joining points (15, 15').

6. The assembled component of claim 1, wherein the joining points (15, 15') are disposed at respective opposing portions of said lower flitch (6) and said upper flitch (7).

7. The assembled component of claim 6, wherein the at least one opening of the intercalation (8) is a slit.

8. The assembled component of claim 1, wherein said intercalation (8) defines a plurality of elongated longitudinally extending openings.

9. The assembled component of claim 8, wherein the plurality of openings and the at least one opening are slits (12, 12', 12", 14).

10. The assembled component of claim 1 wherein said lower flitch includes additional ribs (10), wherein said at least one rib and said additional ribs are arranged in a zig-zag pattern.

11. The assembled component of claim 1, wherein the at least one opening is a slit.

12. The assembled component of claim 1 wherein the at least one groove includes a bottom surface for slidable contact with the bottom portion of the window.

13. The assembled component of claim 1, wherein said guide groove has a rectilinear longitudinal portion and an arcuate end portion and wherein one or more cleaning holes (21, 22) are located in said arcuate end portion.

14. The assembled component of claim 1, wherein the at least one opening comprises a plurality of slits.

15. The assembled component of claim 1 wherein the lower flitch is connected to a side of the upper flitch which is opposite to the upper substantially horizontal major surface of the upper flitch.

16. The assembled component of claim 1 wherein the guide groove in the upper surface of the upper flitch is a substantially upwardly open U-shaped groove having two substantially vertical sides and a substantially horizontal base.

17. The assembled component of claim 1, wherein the intercalation (8) has a bend (16).

18. An assembled component that supports a movable window of a motor vehicle, the component being attached to a fixed window of the vehicle and the component comprising a lower flitch (6), an upper flitch (7) which includes an upper surface entirely defining substantially U-shaped guide grooves configured to support the movable window, said movable window being slidably movable within the grooves, and an intercalation (8) disposed between the lower flitch (6) and the upper flitch (7), the lower flitch (6) and the upper flitch (7) being fixedly connected to and in contact with each other at joining points (15, 41), wherein said intercalation (8) has elongated longitudinally extending slits (12, 12', 12", 14) which are penetrated by elongated longitudinally extending rises (11, 11', 11", 13) of the lower flitch, which contact the upper flitch to form the joining points (15).

19. The assembled component of claim 18, wherein the rises include locating faces (23, 24).

20. The assembled component of claim 19, wherein expansion gaps (29, 30) are disposed between the rises (11', 11") and the slits.

21. An assembled guide rail component for a sliding window of a motor vehicle, the component comprising a lower flitch (6), an upper flitch (7), and an intercalation (8) disposed between the lower flitch (6) and the upper flitch (7), the lower flitch (6) and the upper flitch (7) being directly connected to each other at joining points (15, 15') wherein the upper flitch includes an upper surface which entirely defines at least one guide groove configured to support the sliding window, said window being slidably movable within the at least one groove, wherein said lower flitch (6) defines at least one rib and the intercalation defines at least one longitudinal opening, wherein the at least one rib extends through the at least one longitudinal opening to engage the upper flitch and form at least one of the joining points, and said component further comprising a catch (5) that is connected to the assembled component and fixed to the motor vehicle, and said catch having a surface in contact with one of two opposite sides of a stationary window fixed to the motor vehicle and a clip portion engaging the intercalation (8) and a rear wall (37) of the lower flitch (6).

* * * * *